(12) United States Patent
Kerling

(10) Patent No.: US 12,494,904 B2
(45) Date of Patent: Dec. 9, 2025

(54) METHOD FOR CREATING A TRUSTED MAP OF VERIFIED SECURE NODES FOR A NETWORK OF NODES IN A QUANTUM INTERNET

(71) Applicant: BULL SAS, Les Clayes sous Bois (FR)

(72) Inventor: Frederik Kerling, Nieuwegein (NL)

(73) Assignee: BULL SAS, Les Clayes sous Bois (FR)

(*) Notice: Subject to any disclaimer, the term of this patent is extended or adjusted under 35 U.S.C. 154(b) by 148 days.

(21) Appl. No.: 18/378,343

(22) Filed: Oct. 10, 2023

(65) Prior Publication Data
US 2024/0121082 A1    Apr. 11, 2024

(30) Foreign Application Priority Data

Oct. 11, 2022    (EP) ..................... 22306537

(51) Int. Cl.
*H04L 9/08*    (2006.01)
*H04L 9/00*    (2022.01)

(52) U.S. Cl.
CPC .............. *H04L 9/0852* (2013.01); *H04L 9/50* (2022.05)

(58) Field of Classification Search
CPC ..... H04L 9/0852; H04L 9/50; H04L 63/0823; H04L 9/3236; H04L 9/3268; H04L 9/3239; G06F 11/10; G06F 16/27
See application file for complete search history.

(56) References Cited

U.S. PATENT DOCUMENTS

| | | | |
|---|---|---|---|
| 2021/0126800 A1* | 4/2021 | De La Rocha Gómez-Arevalillo | H04L 9/0852 |
| 2023/0353348 A1* | 11/2023 | Ganguly | H04L 9/0855 |
| 2024/0073010 A1* | 2/2024 | Ganguly | H04L 63/083 |

FOREIGN PATENT DOCUMENTS

| | | |
|---|---|---|
| CN | 110602077 A | 12/2019 |
| CN | 110690961 A | 1/2020 |
| CN | 113596135 A | 11/2021 |

OTHER PUBLICATIONS

European Search Report for corresponding EP Application No. 22306537, dated Feb. 22, 2023.

(Continued)

*Primary Examiner* — Olugbenga O Idowu
(74) *Attorney, Agent, or Firm* — Meagher Emanuel Laks Goldberg & Liao, LLP

(57) ABSTRACT

Method for providing a ledger of verified nodes for a network of nodes in a quantum internet, comprising:

/a/ sending (101), by a central node (N-CH), first qubits (qb1) to a first node (N-U1) and second qubits (qb2) to a second node (N-U2), wherein each first qubit (qb1) is entangled with a second qubit (qb2);

/b/ sending (102), by the central node (N-CH), digital coins to each first node (N-U1) and each second node (N-U2);

/c/ saving (103) to a ledger: information regarding identities of the first, second and central nodes (N-U1, N-U2, N-CH), and information regarding a comparison of first information determined from the first qubits (qb1) to second information determined from the second qubits (qb2); and /d/ if the first information corresponds to the second information, sending (105), by the first and second nodes (N-U1, N-U2), said digital coins back to the central node (N-CH).

13 Claims, 4 Drawing Sheets

(56) References Cited

OTHER PUBLICATIONS

Dehez-Clementi et al., "A Blockchain-enabled Anonymous-yet-Tracable Distributed Key Generation", 2021 IEEE International Conference on Blockchain (Blockchain), IEEE, pp. 257-265, Dec. 6, 2021.

Kolodynski, J. et al., "Device-independent quantum key distribution with single-photon sources," arXiv:1803.07089v4, Apr. 20, 2020.

* cited by examiner

METHOD FOR CREATING A TRUSTED MAP OF VERIFIED SECURE NODES FOR A NETWORK OF NODES IN A QUANTUM INTERNET

The present disclosure generally relates to the fields of blockchain technology and of quantum key distribution, and, in particular, relates to a method for providing in a network of nodes in a quantum internet a map of verified nodes and of verified connections between nodes.

BACKGROUND OF THE INVENTION

Quantum key distribution is a secure communication method which implements a cryptographic protocol. Two users (or nodes) can produce a shared random secret key known only to them, which can then be used to encrypt and decrypt messages. The presence of an eavesdropper trying to gain knowledge of the key can be detected. The lack of an eavesdropper is verified.

In the so-called central-heralding device-independent quantum key distribution configuration described by J. Kolodyski et al., "*Device-independent quantum key distribution with single photon sources*", Arxiv:1803.07089v4, 20 Apr. 2020, a stream of entangled qubits is created by a central source that is not controlled by the two users that want to share a secret key. One qubit of each pair of entangled qubits is sent to a first user, and the other qubit of each pair to the other user.

By measuring the corresponding qubits, the two users can agree on a secret key only known to them, and a secret communication path between the two users may be established.

This method allows to ensure secure connection between two users but does not provide secure end-to-end connections in a network of users.

Accordingly, a need exists for a method that provides secure end-to-end connection in a network of nodes in a quantum internet.

SUMMARY OF THE INVENTION

The present disclosure remedies the shortcomings of prior art.

It is disclosed a method for providing a ledger of verified nodes and of verified connections between nodes for a network of nodes in a quantum internet.

The method comprises:
/a/ sending, by a central node that is part of the network, first qubits to a first user node that is part of the network, and second qubits to a second user node that is part of the network, wherein each of the first qubits is entangled with respectively one of the second qubits;
/b/ sending, by the central node, a first predetermined number of digital coins to each of the first user node and the second user node;
/c/ saving to a ledger: information with respect to identities of the first user node, the second user node and the central node, and information regarding a comparison of first information determined from a portion of the first qubits to second information determined from a portion of the second qubits, each first qubit of the portion of the first qubits being respectively entangled with a second qubit of the portion of the second qubits; and
/d/ if the first information corresponds to the second information, sending, by each of the first user node and the second user node, said first predetermined number of digital coins to the central node.

The method is a verification procedure that allows verifying nodes and connections between nodes.

A central node is a node that creates and sends pairs of entangled qubit-pairs to two other nodes, referred to as first user node and second user node. The qubits of each pair may be maximally entangled.

Nodes are considered as being verified when it has been verified in step /d/ whether the first information corresponds to the second information.

A connection between two user nodes is provided by an entangled qubit-pair, wherein each of the two nodes has one qubit of the entangled qubit-pair. Quantum information may be transmitted between the two user nodes via the entangled qubit-pair.

The first information and second information may be for example a series of bits measured from the qubits, or a hash value determined from such a series of bits.

If the first information corresponds to the second information, the connection provided by the corresponding qubit-pairs is considered as safe and not eavesdropped.

The information regarding the comparison as mentioned by step /c/ may be the first information and the second information. It may also be an indication such as "verification successful" or "verification not successful".

Digital coins may be hash code and constitute an indication on how trustworthy nodes and connections between nodes are, i.e. how likely it is that nodes and connections between nodes are eavesdropped or not functional. Digital coins may be given to nodes and be taken from nodes, depending on whether the comparison mentioned in step /c/ is successful or not.

Central nodes that fail to be successfully verified, i.e. for which the first information is not equal to the second information, lose digital coins in each unsuccessful comparison in step /c/ and may eventually end up with zero digital coins. Such nodes are unable to perform step /b/ and will be ousted from the network.

User nodes that fail to provide first information that corresponds the second information may gain digital coins in each unsuccessful comparison and end up with a high number of digital coins.

An intermediate number of digital coins may be an indicator that nodes are trustworthy. A too low or too high number of digital coins may indicate that nodes are not trustworthy and that connections provided by the qubit-pairs sent by such a node is unsecure or unusable.

The identity of a node may be the IP-address of a classical computer, for example an IPv6-address, to which a node has access. This classical computer may control a quantum enabler configured to process quantum information, allowing the node to exchange quantum information with other nodes.

The ledger provides a current overview over trustworthy nodes and trustworthy connections. The ledger may indicate how often a given node and a given connection between nodes has been successfully or unsuccessfully verified.

The ledger may be an immutable ledger. Thus, information once saved to the ledger cannot be modified any more.

The method allows to provide secure end-to-end connection in a quantum internet. The overall security in the quantum network and in the quantum internet is improved, wherein eavesdroppers, breaks or maleficent nodes may be easily and rapidly identified and ousted from the network.

The shortest, most secure, most stable and available path for sending quantum information in the quantum network can be easily and rapidly identified, and then immediately be used for sending quantum information. The latency for an end-to-end connection is reduced.

In an embodiment, having performed at least once steps /a/-/d/:
/e/ updating a map of the network, wherein in the map a first index is assigned to at least some of the nodes, the first index being function of a number of digital coins that a corresponding node has.

A map as shown in FIG. 4 may be created and updated from the information saved to the ledger, in particular from the most recent entries of the ledger, in order to represent the latest status of verified nodes and verified connections. The map may show the nodes participating in the network and how many digital coins each node possesses.

The map may be updated after one execution of the method, or after several iterations of the method.

In an embodiment, in the map a second index is assigned to pairs of first and second user nodes, the second index being, for a corresponding pair of first and second user nodes, incremented each time that the first information corresponds to the second information for said pair.

The second index may indicate how often a connection between two nodes has been successfully verified. For example, each successful verification may increase the second index by "+1" and each unsuccessful verification by "−1".

In an embodiment, the comparison in step /c/ is a comparison of a first hash value assigned to the first information to a second hash value assigned to the second information.

The hash value is unique with respect to the information from which it has been determined.

Comparison of two hash values allows determining whether the informations from which the two hash values have been determined are equal.

In an embodiment, a node that is part of the network is ousted from the network if a number of digital coins that the node has falls below a lower threshold, or if the number of digital coins that the node has exceeds an upper threshold during an ousting duration.

A node which has zero digital coins may be ousted from the network.

A node may have a high number of digital coins. However, if this number of digital coins exceeds an upper threshold during a predetermined duration, referred to as ousting duration, the node will be ousted from the network.

A node that is ousted from the network cannot be part in the verification procedure described above.

In an embodiment, in step /d/, if in the comparison the first information does not correspond to the second information, execution of the method is interrupted and the first user node and the second user node keep the digital coins sent in step /a/ by the central node.

Thus, an unsuccessful comparison of the first information to the second information is directly translated into the number of digital coins that a node has.

In an embodiment, the ledger is a blockchain, and step /c/ comprises saving the information with respect to identities of the first user node, the second user node and the central node, and the information regarding the comparison to a latest block of the blockchain.

The history of all verification procedures is saved to the blockchain and cannot be modified by nodes of the network.

In an embodiment, if it is not compared during a verification duration whether the first information corresponds to the second information, execution of the method is interrupted and the first user node and the second user node keep the digital coins sent by the central node.

If the comparison is not made during a predetermined duration, referred to as verification duration, the verification procedure ends. Thus, inactive nodes that do not participate in verification procedures can be detected.

In an embodiment, the comparison of step /c/ is performed by a mining node that is part of the network.

The mining node carries out a comparison of the first and second informations received from nodes of the network.

Such mining may be carried out by the classical computer of the mining node. The mining node may be any node that is part of the network.

For example, the ledger may be a blockchain and the method may be iterated, and information regarding a given number of comparisons according to step /c/ may be saved to a latest block of the blockchain. The mining node then carries out a comparison of all first and second informations since the previous block.

In an embodiment, the method comprises, for a new node that is not part of the network and that seeks to join the network, an initiation procedure, comprising:
determining a third node that is part of the network and a fourth node that is part of the network;
performing, in a first initiation step, steps /a/-/c/ with the new node being the first user node, the fourth node being the second user node and the third node being the central node,
performing, in a second initiation step, steps /a/-/c/ with the third node being the first user node, the new node being the second user node and the fourth node being the central node,
if, in the first initiation step, the first information corresponds to the second information and if in the second initiation step, the first information corresponds to the second information, performing, in a third initiation step, steps /a/-/d/ with the third node being the first user node, the fourth node being the second user node and the new node being the central node,
if, in the third initiation step, the first information corresponds to the second information, integrating the new node into the network.

In the first and second initiation steps, the first and second user nodes may keep, if the first information corresponds to the second information, the digital coins sent to them by the central node, rather than sending them back to the central node.

All verification procedures and initiation procedures may be saved to the ledger. Thus, the ledger provides information about the current status and about the evolution of trustworthy nodes and trustworthy connections.

The initiation procedure allows nodes that have never been part of the network as well as nodes that were formerly part of the network but ousted, to join the network.

Upon successful performance in the initiation procedure, the new node node does not return the digital coins that it received from the user node and can participate in the network.

In an embodiment, if, in the third initiation step, the new node is integrated into the network, awarding a second predetermined number of digital coins to the new node and awarding a third predetermined number of digital coins to each of the third node and the fourth node.

The second predetermined number of digital coins sent to the new node further increases the number of digital coins of this node. Otherwise, the number of digital coins that the new node has may be too low and the new node may be ousted upon one or few unsuccessful verification procedures in which it is involved.

A third predetermined number of digital coins is given to the third and fourth nodes in order to compensate for the digital coins that they sent to the new node during the first and second initiation steps.

In an embodiment, if the third initiation step is not performed within an initiation duration after the first or second initiation steps, the new node loses the digital coins that it has received during the first and second initiation step, and the initiation procedure is interrupted.

If the initiation step is not carried out within a predetermined duration, referred to as initiation duration, the initiation procedure may end.

Another aspect of the disclosure is related to a non-transitory computer readable storage medium, having stored thereon a computer program comprising program instructions, the computer program being loadable into a data-processing unit and adapted to cause the data-processing unit to carry out a method for providing a ledger of verified nodes and of verified connections between nodes for a network of nodes in a quantum internet according to any of the embodiments cited above.

FIG. 5 shows such a non-transitory computer readable storage medium.

FIGS. 2 and 3 can form the flowchart for the general algorithm of such a computer program.

BRIEF DESCRIPTION OF THE DRAWINGS

The accompanying drawings, which are incorporated herein and form a part of the specification, illustrate the present invention and, together with the description, further serve to explain the features of the invention and to enable a person skilled in the pertinent art to make and use the invention. In the drawings, like reference characters indicate identical or functionally similar elements.

DESCRIPTION OF EMBODIMENTS

Now, a method for providing a ledger and a map of verified users and of verified connections between users in a network of users in a quantum internet will be described. The method may be implemented according to several embodiments.

In a quantum internet, each user, further referred to as node, has access to a quantum quantum enabler configured to process quantum information. In order to be able to share quantum information between nodes, pairs of maximally entangled qubits are created and sent to the nodes across the quantum internet. Each node further has access to a classical computer and to classical internet.

In quantum key distribution (QKD), two user nodes produce a random shared key known only to them and that may be used for example for encrypting their communication.

Figure 1:
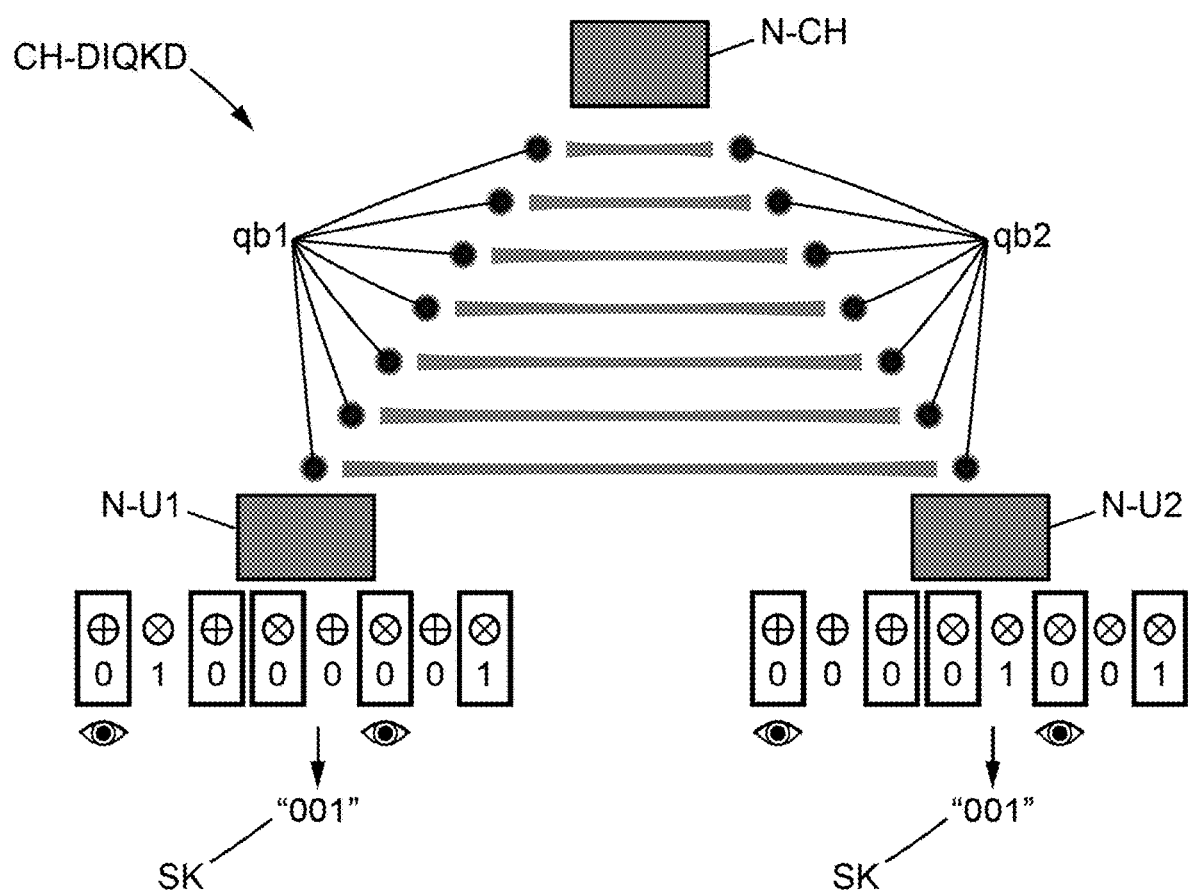
FIG. 1 is a schematic representation of a central-heralding device-independent quantum key distribution configuration.

In the central-heralding device-independent quantum key distribution configuration CH-DIQKD described by J. Kolodyski et al., "*Device-independent quantum key distribution with single photon sources*", Arxiv:1803.07089v4, 20 Apr. 2020, whose principle is illustrated in FIG. 1, a stream of entangled qubit-pairs qb1, qb2 is created by a node N-CH, further referred to as central-heralding node or central node. One qubit qb1 of each pair is sent to a first user node N-U1, and the other qubit qb2 of each pair to a second user node N-U2 that wants to share a key SK with the first user node N-U1.

The first and second user nodes N-U1, N-U2 may analyze the qubits qb1, qb2 that they receive. For example, when the qubits qb1, qb2 are photons, the first and second user nodes N-U1, N-U2 may use a polarizer to measure the polarization of the photons.

Each photon may have a random polarization, i.e. rectilinear or diagonal polarization with equal probability. The polarization of two entangled photons is correlated.

Both user nodes N-U1, N-U2 may agree in advance that for each photon that is measured they randomly use either a rectilinear or a diagonal configuration (hereafter "r" for rectilinear and "d" for diagonal) of the polarizer. Each user node N-U1, N-U2 then obtains a stream of bits, i.e. either a "0" or a "1" for each photon that is measured.

If the same configuration of the polarizer is used (i.e. both user nodes use "r" or both "d") for a given pair of entangled photons, the same value will be measured (either both "0" or both "1"). If a different configuration is used (i.e. one user node uses "r" and the other "d") for a given pair of photons, the values measured for the two photons are not correlated.

Having measured the stream of entangled photons, the user nodes N-U1, N-U2 can share with each other (via classical internet) the sequence of configurations of the polarizer that they used for the measurements. In the example shown in FIG. 1, eight photon-pairs are measured, and the random configurations of the polarizers used by the user nodes N-U1, N-U2 are: First used node N-U1: "r d r d r d r d"; Second user node N-U2: "r r r d d d d d". For the first, third, fourth, sixth and eight measurement the same configurations have been used.

Furthermore, for a small portion (e.g. 1%) of the qubit-pairs that have been measured in the same configuration, the obtained bit-values ("0" or "1") may be shared between the user nodes via classical Internet. For example, the results of the first and sixth measurement may be shared between the user nodes and compared.

In case of successful comparison, it can be concluded that the sequence of bits of the remaining qubit-pairs (e.g. 99%) that have been measured in the same configuration, here the third, fourth and eight measurements, are equal.

Here, the obtained sequence is "001" and can be used as a shared key SK by the user nodes N-U1, N-U2. The presence of a potential eavesdropper intercepting some photons, of a maleficent user node or of other kinds of disturbances could be detected by the user nodes N-U1, N-U2, since the state of the photons that they receive would be modified by such interventions.

In a network of nodes, a multitude of nodes are mutually interconnected. Distant nodes may rely on other nodes for providing them with entangled qubits. Furthermore, if two distant nodes want to share quantum information, the quantum information may transit via other nodes.

Therefore, it is crucial for the nodes on the network to know which nodes and which connections between nodes are trustworthy. The "trustworthiness" may be verified repeatedly by application of the above-mentioned configuration CH-DIQKD of FIG. 1.

A central node N-CH is considered as trustworthy if it is able to create and send qubit pairs qb1, qb2 that are not eavesdropped or disturbed otherwise. Similarly, a connection between two user nodes N-U1, N-U2 is considered as trustworthy if entangled photon pairs provided to these user nodes N-U1, N-U2 are not eavesdropped or disturbed otherwise, and if the user nodes N-U1, N-U2 are able to create a shared key SK from the qubits qb1, qb2.

Figure 2:
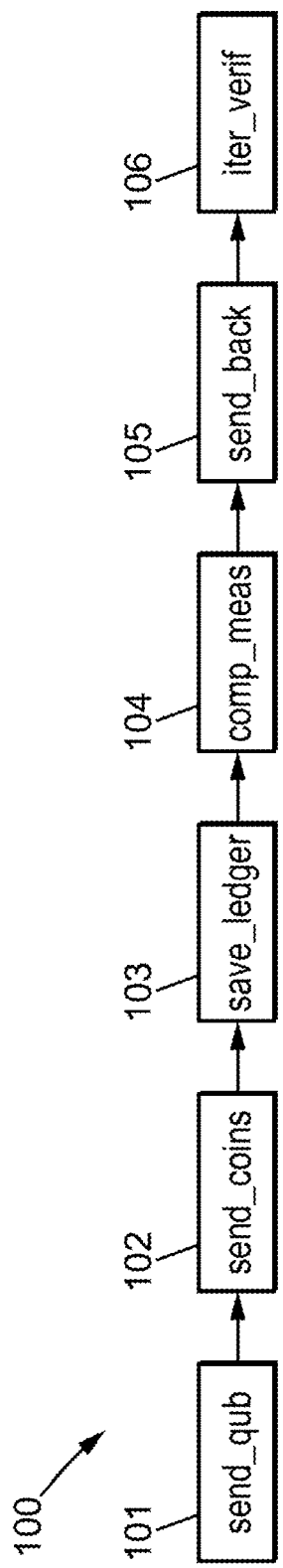
FIG. 2 is a flow chart of a verification procedure for nodes that are part of a network of nodes in the quantum internet.

A flow chart of a verification procedure 100 whose goal is to verify the trustworthiness of nodes and of connections between nodes is shown in FIG. 2.

Digital coins, also referred to as ledger coins, may be used as a measure of the trustworthiness. The number of digital coins that each node has may increase or decrease repeatedly and be updated in an immutable blockchain ledger via classical internet.

Each user node N-U1, N-U2 with at least one digital coin can participate in a verification procedure 100 and start a verification procedure 100, in which it is then either the central node N-CH or one of the user nodes N-U1, N-U2.

A central node N-CH may create a stream of pairs of entangled qubits qb1, qb2 and send 101 one qubit of each pair qb1, qb2 to a first user node N-U1 and a second user node N-U2.

The central node N-CH then sends 102 half a digital coin to the first user node N-U1 and half a digital coin to the second user node N-U2.

The user nodes N-U1, N-U2 each measure a portion of the stream of qubits qb1, qb2 that they received and deduce a key SK from it. Each user node N-U1, N-U2 determines a hash value as a function of the content of the key. Each user node N-U1, N-U2 may have a copy of the blockchain ledger or of a portion of the blockchain ledger and save the hash value to a latest block of its copy of the block chain.

The user nodes N-U1, N-U2 then send their hash values to each other and to the network of nodes. Each node of the network may have a copy of the blockchain ledger or of a portion of the blockchain ledger and save the received hash values to the latest block of their blockchain ledger.

The above-mentioned steps may be iterated, wherein in each iteration other nodes of the network may be the central node N-CH, the first user node N-U1 or the second user nodes N-U2.

Each node of the network builds a block that contains the hash values of several iterations. When a predetermined number of comparisons are contained in a block, a mining node, which may be any node of the network, is chosen. The mining node then mines the hash values, i.e. it compares 104 whether the hash values are equal, and mines all comparisons into a block.

The mining node may be selected randomly among the network of nodes by "proof of stake", which allows balancing the resources required for mining.

If the hash values are not mined by the mining node within a predetermined duration, referred to as verification duration, the verification procedure 100 may automatically end, such as if the hash values were unequal. Each user node N-U1, N-U2 then keeps the half digital coin that it received from the central node N-CH.

If both hash values turn out to be identical during the mining, it is considered that the verification procedure 100 was successful, meaning that the central node N-CH has the ability to create and send entangled qubit-pairs qb1, qb2 that are not eavesdropped or disturbed otherwise.

Upon successful verification, the first and second user nodes N-U1, N-U2 both send 105 half a digital coin back to the central node N-CH, and each of the involved user nodes N-U1, N-U2, N-CH ends up with the same number of digital coins as before the verification.

If the comparison is not successful, the first and second user nodes N-U1, N-U2 may keep the digital coins that they got from the central node N-CH. Thus, the central node ends up with less digital coins and the first and second user nodes N-U1, N-U2 with more digital coins than before the verification.

A node that loses its last digital coin and ends up with zero coins is ousted from the network.

A node with a too high amount of coins, i.e. with a number of digital coins above a predetermined threshold, may be considered as "inactive" by other nodes. Such a "capped" node may not be chosen as a user node N-U1, N-U2 by central nodes that seek to start a verification procedure 100. If a node is not involved in a verification procedure 100 during a predetermined duration, referred to as ousting duration, it may lose all of its digital coins and be ousted from the network.

The predetermined threshold may be function of an average number of verification procedures carried out per node, or be function of the total number of nodes on the network.

The information regarding the verification procedure 100 may be saved 103 to a ledger, in particular:
  IP-address of the first user node N-U1, the second user node N-U2, the central node N-CH, the mining node;
  an indication that the performed procedure is a verification procedure 100;
  the hash values determined by the first and second user nodes N-U1, N-U2;
  It may further be mentioned in the ledger whether the verification procedure was successful or not.

The verification procedure 100 may be performed repeatedly, wherein in each verification procedure 100 any node of the network may be the first user node N-U1, the second user node N-U2, the central node N-CH or the mining node. Thus, each node may be continuously verified. Several of these verification procedures 100 may take place in parallel for different nodes.

The ledger may be updated repeatedly, after each verification procedure 100.

The above-mentioned ousting duration and verification duration may be defined with respect to the blockchain ledger. For example, the verification duration may correspond to the creation of 6 new blocks of the blockchain ledger, and the ousting duration may correspond to the creation of 60 new blocks of the blockchain ledger.

The creation of one new block may take several minutes.

Nodes that seek to stay part of the network and that seek to be considered as trustworthy will be verified repeatedly by other nodes in a verification procedure 100 and verify other nodes in a verification procedure 100.

Figure 3:
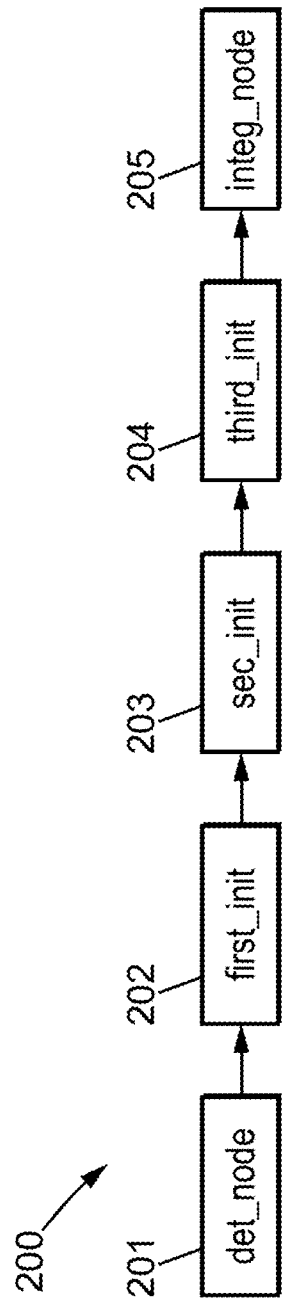
FIG. 3 is a flow chart of an initiation procedure for nodes that seek to join a network of nodes in the quantum internet.

A new node that seeks to join the network does not have any digital coins. An initiation procedure is carried out, since only initiated nodes having at least one digital coin can be part of the network and start verification procedures. A flow chart of the initiation procedure 200 is illustrated in FIG. 3.

Two user nodes N-U1, N-U2, referred to as third node and fourth node hereafter, that are already part of the network, are chosen 201 to participate in the initiation procedure.

In a first initiation step 202, the first part of the verification procedure 100 is reproduced with the third node being the central node N-CH, the new node being the first user node N-U1 and the fourth node being the second user node N-U2. The third node sends an entangled qubit pair qb1, qb2 to the new node and the fourth node. In addition, half a digital coin is sent by the third node to the fourth node and to the new node. The qubits qb1, qb2 are measured and hashed and the hash values are sent to the nodes of the network.

In a second initiation step 203, the first part of the verification procedure 100 is reproduced, now with the fourth node being the central node N-CH, the third node being the first user node N-U1 and the new node being the second user node N-U2. The fourth node sends an entangled qubit pair qb1, qb2 to the new node and the third node. In addition, half a digital coin is sent by the fourth node to the third node and to the new node. The qubits qb1, qb2 are measured and hashed and the hash values are sent to the nodes of the network.

The block containing the hash values of the first and second initiation steps is mined. The digital coins received by the user nodes N-U1, N-U2 in the first and second initiation steps 202, 203 are not returned to the central node N-CH upon successful comparison of the hash values in the first and second initiation steps.

In a third initiation step 204, if the mining in the first and second initiation steps was successful, the first part of the verification procedure 100 is reproduced, with the new node being the central node N-CH, the third node being the first user node N-U1 and the fourth node the second user node N-U2. The new node sends a stream of entangled qubits qb1, qb2 to the third node and the fourth node, and half a digital coin to the third node and the fourth node. The qubits qb1, qb2 are measured and hashed and the hash values are sent to the nodes of the network.

The block containing the hash values of the third initiation step is mined by a mining node. Upon successful comparison of the hash values, the initiation procedure 200 is considered successful and the new node can integrate 205 the network.

If the third initiation step is not started within a predetermined duration, referred to as initiation duration, from the mining in the first and second initiation step, the initiation procedure 200 may automatically end and the new nodes will lose its digital coins.

The initiation duration may correspond for example to the creation of six new blocks of the blockchain ledger since the start of the initiation procedure 200.

Upon successful initiation, the new node is awarded one digital coin and now has two digital coins and can participate in the network. Furthermore, the third node and the fourth node may both be awarded half a digital coin.

The information regarding the initiation procedure may be written to a ledger, in particular:
  IP-addresses of the third node, the fourth node, the new node, the mining node;
  an indication that the procedure is an initiation procedure 200;
  the hash values determined by the corresponding nodes in the first, second and third initiation step.

It may be further mentioned in the ledger whether the initiation procedure 200 was successful or not.

The initiation procedure 200 may be iterated whenever a new node wants to join the network, or whenever a node that was formerly part of the network and that has been ousted seeks to joint the network again.

The identity, i.e. the IP-address, of a new node may be determined by an existing public key infrastructure via the classical internet.

Only a minor portion of the stream of entangled qubits (typically <1%) sent by a central node N-CH may be used for the verification procedure 100 or the initiation procedure 200 in the "CH-DIQKD" configuration. The major portion of the qubits (typically >99%) may be stored by the first and second user nodes N-U1, N-U2 and further be used to for the transmittance of quantum information between them, provided that the verification procedure 100 was successful.

A map MP may be created from the information saved to the ledger, in particular from the most recent blocks of the ledger. The map MP shows the nodes participating in the network, and how often a given connection has been verified by which node and how many digital coins each node possesses. The map MP may be updated after each execution of the verification procedure 100/the initiation procedure 200 or after several iterations 106 of the verification procedure 100/the initiation procedure from the ledger, in order to represent the latest status of verified nodes and verified connections.

Figure 4:
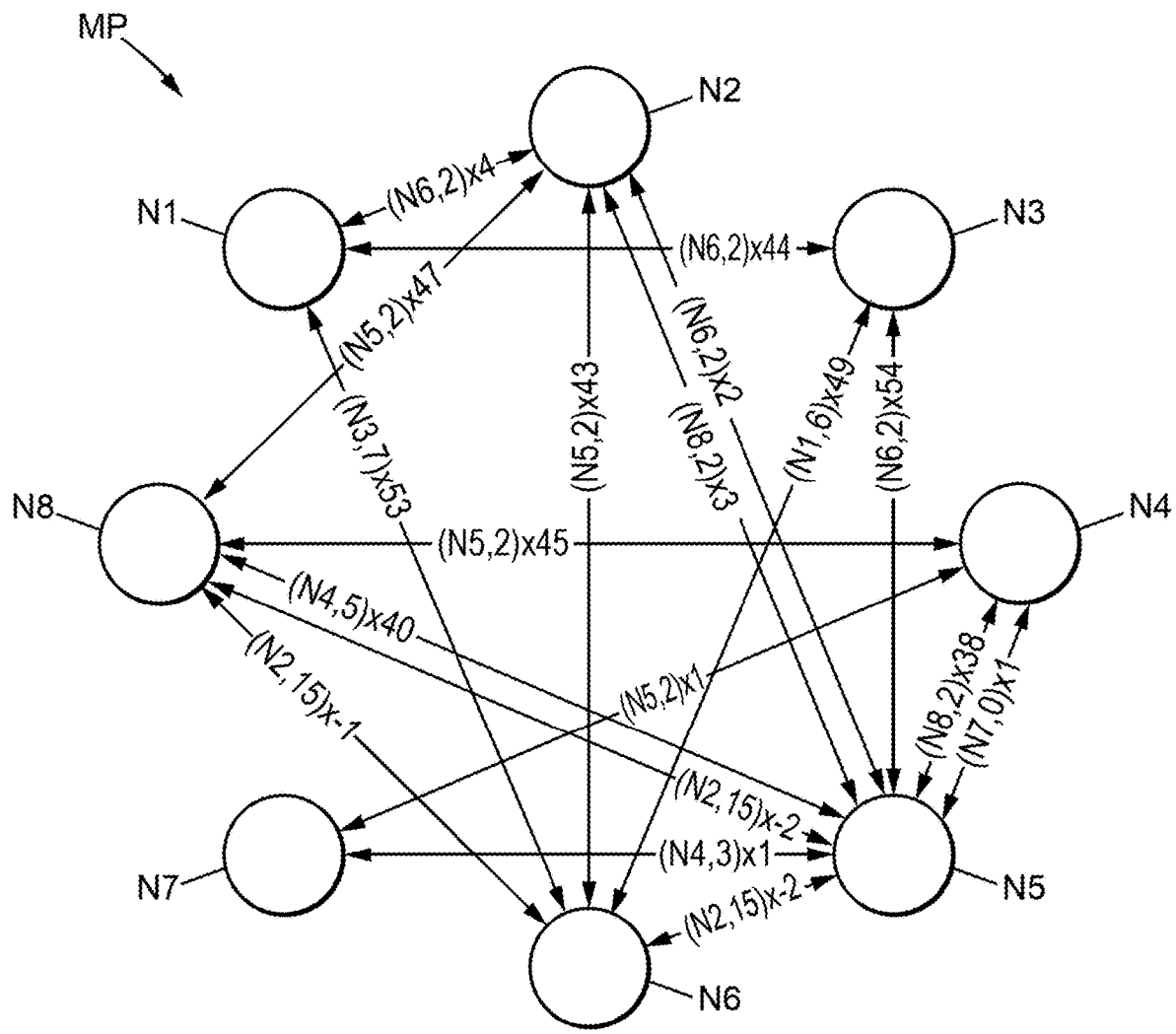
FIG. 4 shows a map of nodes and of connections between nodes and that indicates the trustworthiness of each node and of each connection.

The map as shown in FIG. 4 is created from the last 6 blocks of a blockchain ledger, before the mining of the latest block.

The map MP indicates which nodes and which connections between nodes can be considered as trustworthy.

The indication of type "(Na,b)×c" located on the connection line between two nodes teaches that a node "Na" created entangled qubit-pairs for these two nodes. The node "Na" possesses "b" digital coins and has been successfully verified "c" times. "c" is the sum of successful and unsuccessful verifications, wherein a successful verification increases "c" by "+1", and an unsuccessful verification by "−1".

It can be understood from the map MP that nodes N1, N3, N4, N5, N6, N8 may be considered as reliable creators of entangled qubit-pairs, since a high average number "c" of verification procedures 100 (between 30 and 60) has been successfully carried out by nodes N1, N3, N4, N5, N6, N8 as a central node. The number of digital coins "b" that each of these nodes possesses is between 2 and 7.

Nodes will be considered as trustworthy if the number of digital coins that they possess are within a certain range. This range may be dynamic and depend on several parameters, such as the total number of nodes on the network.

The map MP further indicates that node N2 experiences problems. Node N2 has accrued 15 digital coins, considerably more than the nodes N1, N3, N4, N5, N6, N8. Connections N8-N5, N6-N5, and N6-N8 have used N2 as a central node providing qubit-pairs and have a negative number of successful verification procedures 100, i.e. the major part of the verification procedures 100 have failed and been unsuccessful.

However, N5 is a reliable central node for connections N2-N6 and N2-N8. N5 has a low number of coins and connections N2-N6 and N2-N8 have a positive number of successful verification procedures 100. Thus, the connection N2-N5 is not eavesdropped or broken.

The map MP further teaches that node N7 has 0 digital coins, and that N7 was once successfully verified by nodes N4 and N5. This can be interpreted as that N7 is a new node that is undergoing an initiation procedure 200 with N4 and N5.

Any nodes on the quantum network that seek to exchange quantum information can calculate a map and use the map MP in order to find the most trustworthy node as a qubit-pair creator, and the best path between them across the network. The map MP is public within the network and can be calculated by all nodes.

Figure 5:
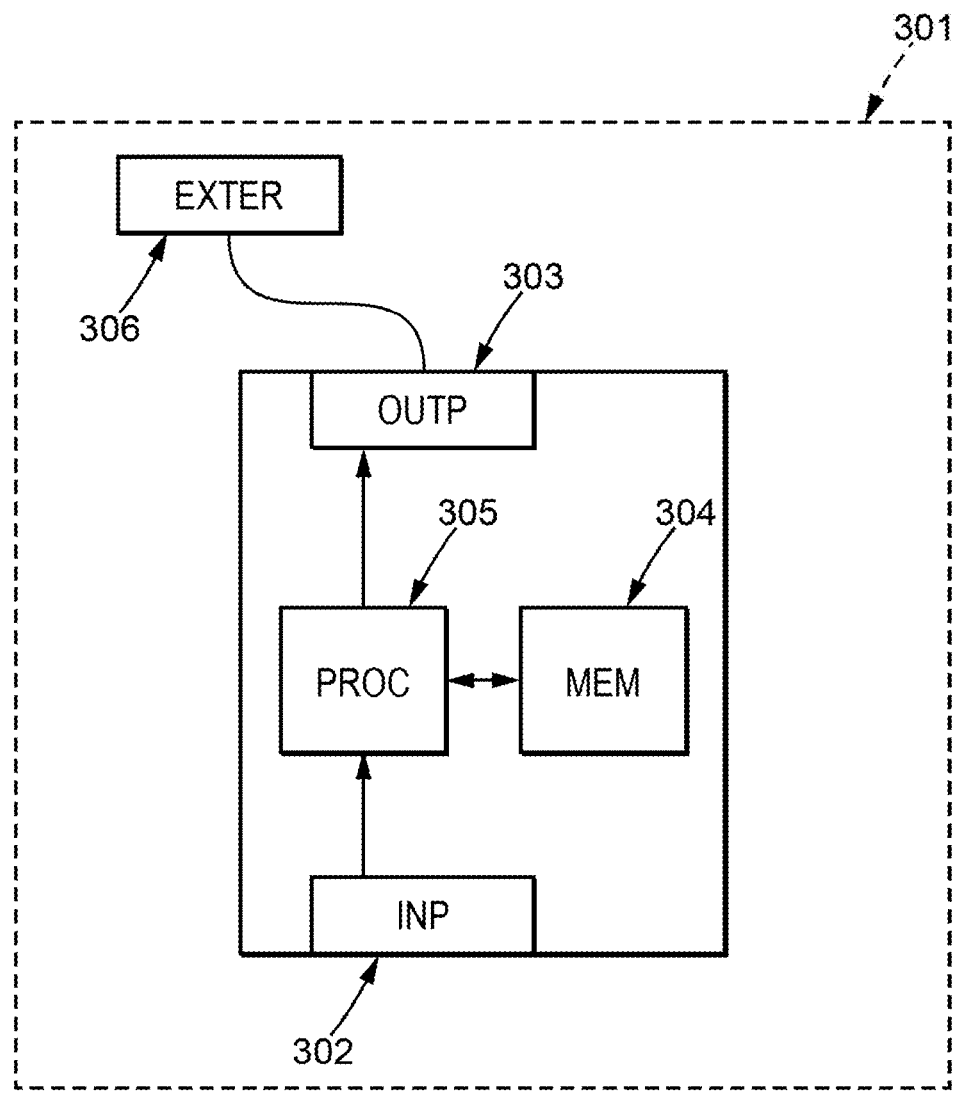
FIG. 5 shows a non-transitory computer readable storage medium configured to implement a method for providing a ledger of verified nodes and of verified connections between nodes for a network of nodes in a quantum internet.

FIG. 5 shows a control unit 301 configured to implement the method described in relation to FIGS. 2 and 3.

The control unit 301 may comprise a memory 304 for storing instructions for implementation of at least part of the method, the data received, and temporary data for performing the various steps and operations of the method.

The control unit 301 further comprises a control circuit 305. This control circuit can be, for example: a processor capable of interpreting instructions in the form of a computer program, or an electronic card whose steps and operations of the method of disclosure are described in silicon, or a programmable electronic chip such as an FPGA for "Field-Programmable Gate Array", as a SOC for "System On Chip" or as an ASIC for "Application Specific Integrated Circuit".

SOCs or systems-on-chips are embedded systems that integrate all the components of an electronic system into a single chip. An ASIC is a dedicated electronic circuit that brings together custom features for a given application. ASICs are generally configured during their manufacture for performing a dedicated. The programmable logic circuits of the FPGA type are reconfigurable electronic circuits by the user of the control unit 301.

The control unit 301 comprises an input interface 302 for receiving messages or instructions, and an output interface 303 for communication with the electronic entities of the system which implements the method according to the present disclosure.

Depending on the embodiment, the control unit 301 may be a computer, a computer network, an electronic component, or another device comprising a processor 305 operatively coupled to a memory 304, and, depending on the mode of operation, selected embodiment, a data storage unit, and other associated hardware elements such as a network interface and a media reader for reading a removable storage medium 306 and writing on such a medium. The removable storage medium may be, for example, a flash disk, a USB stick, etc.

According to the embodiment, the memory 304, the data storage unit or the removable storage medium contains instructions which, when executed by the processor 305, cause this control unit 301 to performing or controlling the input interface 302, output interface 303, data storage in the memory 304 and/or data processing and method implementation examples described herein.

In addition, the instructions can be implemented in software form, in which case it takes the form of a program executable by a processor 305, or in hardware form, or "hardware", as an integrated circuit specific application ASIC, a SOC on a microchip, or in the form of a combination of hardware and software elements, for example a software program intended to be loaded and executed on an electronic component described above such as FPGA processor.

The control unit 301 can also use hybrid architectures, for example architectures based on a CPU+FPGA, or an MPPA for "Multi-Purpose Processor Array".

The control unit 301 may be a component which is configured to implement creation and sending of entangled qubit-pairs and other parts of the described method.

It will be appreciated that the embodiments described above are illustrative of the invention disclosed herein and that various modifications can be made without departing from the scope as defined in the appended claims.

The invention claimed is:

1. A method for providing a ledger of verified nodes and of verified connections between nodes for a network of nodes in a quantum internet, comprising:
   (a) sending, by a central node that is part of the network, first qubits to a first user node that is part of the network, and second qubits to a second user node that is part of the network, wherein each of the first qubits is entangled with respectively one of the second qubits;
   (b) sending, by the central node, a first predetermined number of digital coins to each of the first user node and the second user node;
   (c) saving to a ledger; information with respect to identities of the first user node, the second user node and the central node, and information regarding a comparison of first information determined from a portion of the first qubits to second information determined from a portion of the second qubits, each first qubit of the portion of the first qubits being respectively entangled with a second qubit of the portion of the second qubits; and
   (d) if the first information corresponds to the second information, sending, by each of the first user node and the second user node, said first predetermined number of digital coins to the central node.

2. The method of claim 1, further comprising, having performed at least once steps (a)-(d):
   (e) updating a map of the network, wherein in the map a first index is assigned to at least some of the nodes, the first index being function of a number of digital coins that a corresponding node has.

3. The method of claim 2, wherein in the map a second index is assigned to pairs of first and second user nodes, the second index being, for a corresponding pair of first and second user nodes, incremented each time that the first information corresponds to the second information for said pair.

4. The method of claim 1, wherein the comparison in step (c) is a comparison of a first hash value assigned to the first information to a second hash value assigned to the second information.

5. The method of claim 1, wherein a node that is part of the network is ousted from the network if a number of digital coins that the node has falls below a lower threshold, or if the number of digital coins that the node has exceeds an upper threshold during an ousting duration.

6. The method of claim 1, wherein, if in the comparison the first information does not correspond to the second information, execution of the method is interrupted and the first user node and the second user node keep the digital coins sent in step (a) by the central node.

7. The method of claim 1, wherein the ledger is a blockchain, and wherein step (c) comprises saving the information with respect to identities of the first user node, the second user node and the central node, and the information regarding the comparison to a latest block of the blockchain.

8. The method of claim 1, wherein, if it is not compared during a verification duration whether the first information corresponds to the second information, execution of the method is interrupted and the first user node and the second user node keep the digital coins sent by the central node.

9. The method of claim 1, wherein the comparison of step (c) is performed by a mining node that is part of the network.

10. The method of claim 1, wherein the method comprises, for a new node that is not part of the network and that seeks to join the network, an initiation procedure, comprising:

determining a third node that is part of the network and a fourth node that is part of the network;

performing, in a first initiation step, steps (a)-(c) with the new node being the first user node, the fourth node being the second user node and the third node being the central node, performing, in a second initiation step, steps (a)-(c) with the third node being the first user node, the new node being the second user node and the fourth node being the central node, if, in the first initiation step, the first information corresponds to the second information and if in the second initiation step, the first information corresponds to the second information, performing, in a third initiation step, steps (a)-(d) with the third node being the first user node, the fourth node being the second user node and the new node being the central node, if, in the third initiation step, the first information corresponds to the second information, integrating the new node into the network.

11. The method of claim 10, wherein, if, in the third initiation step, the new node is integrated into the network, awarding a second predetermined number of digital coins to the new node and awarding a third predetermined number of digital coins to each of the third node and the fourth node.

12. The method of claim 10, wherein, if the third initiation step is not performed within an initiation duration after the first or second initiation steps, the new node loses the digital coins that it has received during the first and second initiation step, and the initiation procedure is interrupted.

13. A non-transitory computer readable storage medium, having stored thereon a computer program comprising program instructions, the computer program being loadable into a data-processing unit and adapted to cause the data-processing unit to carry out a method for providing a ledger of verified nodes and of verified connections between nodes for a network of nodes in a quantum internet of claim 1.

* * * * *